United States Patent [19]
Allen

[11] 4,064,328
[45] Dec. 20, 1977

[54] AUXILIARY DUAL BATTERY TERMINAL

[75] Inventor: Charles H. Allen, Dallas, Tex.

[73] Assignee: Batteries Unlimited, Inc., Dallas, Tex.

[21] Appl. No.: 764,467

[22] Filed: Jan. 31, 1977

[51] Int. Cl.² ............................................. H01M 2/30
[52] U.S. Cl. .................................... 429/121; 429/178
[58] Field of Search ............... 429/121, 122, 178, 179, 429/180, 181

[56] References Cited
U.S. PATENT DOCUMENTS

| 1,175,651 | 3/1916 | Marko | 429/178 |
| 2,578,191 | 12/1951 | Longaker | 429/178 |

FOREIGN PATENT DOCUMENTS 895,159  1/1945  France .................................. 429/121

*Primary Examiner*—Donald L. Walton
*Attorney, Agent, or Firm*—Joseph H. Schley; Thomas L. Cantrell

[57] ABSTRACT

An auxiliary dual battery terminal having conventional tapered post and screwthreaded stud upstanding from a generally flat generally triangular or T-shaped body in spaced relation to its mounting collar for connecting an electrical conductor, having a clamp collar type or an apertured flat lug type of end terminal, to the positive or negative terminal post of a storage battery in spaced relation to said battery and its post whereby either type of conductor terminal may be fastened to the aforesaid auxiliary dual battery terminal and access to said attached conductor terminal is facilitated.

10 Claims, 5 Drawing Figures

AUXILIARY DUAL BATTERY TERMINAL

BACKGROUND OF THE INVENTION

Heretofore and presently, most electrical storage batteries, of the type used in association with generators or alternators driven by internal combustion engines for supplying electrical current to starters, lighting systems and other accessories of the engines, have been and are provided with upstanding tapered positive and negative terminal posts for clamping engagement with the internal surfaces of the collars of clamp-type end terminals of positive and negative electrical cables or conductors. Of course, the tapering of the battery posts is adapted to facilitate detachment of clamp-type cable end terminals therefrom. Since this type of clamp collar is in the form of a yoke having a transverse adjusting bolt and nut for varying its internal diameter, it is difficult to install and remove. Moreover, its electrical connection to a battery terminal post is frequently so loose and/or corrosion builds up therebetween that increased resistance to flow of electrical current results with consequent loss of power to said starters and other accessories. It has been found that this corrosion and power loss may be minimized by interposing an auxiliary terminal, having a collar for positive attachment, such as by homogeneous welding, to a battery terminal post and a post or stud for clamping engagement by a cable terminal, between the battery post and cable terminal so as to space the latter apart. Usually, the studs of the auxiliary terminals are screwthreaded for engagement by a nut or other complementary fastener to confine the flat apertured lug of a cable terminal adapter or fitting thereupon as disclosed by the following U.S. Pat. Nos.

1,175,651, Marko, Mar. 4, 1916;
2,003,053, Pavlovic et al., May 28, 1935;
2,578,191, Longaker, Dec. 11, 1951.

As illustrated by Pavlovic et al, it is highly desirable to weld or otherwise permanently join the collar of an auxiliary terminal to the terminal post of a battery.

In the patent to Logan, U.S. Pat. No. 1,663,013, Mar. 20, 1928, the post of an auxiliary terminal is adapted to be engaged by the clamp collar of a cable terminal.

Somewhat similar collar-to-collar auxiliary terminals are shown by French Pat. Nos. 895.159 (1945) and 923.807 (1947), the auxiliary terminal of the former patent having a screwthreaded stud projecting from its post and a coacting wing nut for confining a cable clamp on said post. Although an apertured flat lug type of cable terminal could be confined on this stud by the wing nut, it has been found that this structure is impractical because of the elevated height of said stud which necessitates increased height of the battery compartment. Also, the relatively small diameter of the upper portion of a tapered battery post provides insufficient support for mounting a stud therein.

Heretofore, insofar as known, separate and different auxiliary battery terminals have been required for the different types of cable end terminals, i.e., auxiliary terminals having either a post or a screwthreaded stud.

SUMMARY OF THE INVENTION

The auxiliary battery terminal of this invention is of the dual post and stud type for connecting an electrical cable or conductor to a terminal post of an electrical storage battery with the end terminal of the cable in spaced relation to the usual battery terminal post so as to minimize corrosion. Of course, the post of the auxiliary dual battery terminal is complementary to the tapered terminal post of the battery for engagement by the conventional clamp type collar terminal of a cable or conductor. When the cable terminal is of the type having an apertured flat lug, the latter is confined on the stud of the auxiliary terminal by a nut or other suitable fastener screwthreaded on said stud. The auxiliary terminal comprises a generally flat body or plate of suitable weldable electrically conductive material, such as lead or lead alloy, having its post and stud upstanding or projecting upwardly therefrom in spaced relation to each other and to a mounting collar integral with the body for complementary engagement upon a battery terminal post. The auxiliary dual terminal body may be generally triangular or generally T-shaped in plan with its mounting collar, post and stud at the corners or extremities thereof, whereby the axes of the upstanding post and stud are disposed in a common plane in angular relation to the parallel axis of said collar. Also, the post and stud are of greater height than the mounting collar so as to project therebeyond. Due to the shape of the terminal body and such projection of its post and stud, the latter may be closer to the collar than to each other so as to permit minimum size of said body without sacrificing ready access to said terminal post and stud. In fact, the clamp collar of a cable end terminal may overlie the battery terminal post without interference.

Preferably, this battery terminal mounting collar is permanently joined or fused, such as by welding, soldering or puddling, to a battery terminal post so as to eliminate or minimize resistance to the flow of electrical current due to any corrosion, looseness or gap between said collar and post, such as can arise when a clamp-type collar of a cable terminal is attached directly to a conventional tapered battery post. Regardless of how the battery post and the mounting collar of the terminal body are formed, frequently, they have reverse respective exterior and interior tapers so as to permit release thereof from their respective molds or other forming means. Accordingly, permanent corrosion-proof fastening of the auxiliary dual terminal to the battery terminal post is most desirable.

It is noted that auxiliary dual battery terminals, constructed in accordance with this invention, may be secured to the terminal posts of electrical storage batteries in the field of use or during manufacture whereby a cable end terminal of either the clamp collar or apertured flat lug type may be readily connected to and disconnected from the post or stud of each of such auxiliary terminals. Preferably, the auxiliary terminal post and stud have enlarged coaxial base portions so as to provide upset annular shoulders upon which the clamp collars or apertured flat lugs of the cable terminals are adapted to rest for supporting said cable terminals in outwardly and/or upwardly spaced relation to the body and collar of each auxiliary terminal as well as to the terminal post and upper surface of the battery. In order to comply with SAE specifications, applicable to the terminal posts of electrical storage batteries, such posts must have fixed or exact standard tapers and diameters and the tapered positive post is always of slightly greater maximum and minimum diameters than the tapered negative post of each battery. Accordingly, left and right hand or mirror image auxiliary terminals are required, with the tapered internal diameters of the mounting collar and external diameters of the tapered post of each negative terminal being less than such diameters of the mounting collar and tapered post of each positive terminal. It is noted, however, that the relative positions of the terminal post and stud are reversible.

When desirable or necessary, both the post and stud of either one or both (positive and negative) of the auxiliary dual battery terminals may have the end terminals of electrical cables or conductors connected thereto at the same time by the respective clamp collar and apertured flat lug thereof for supplying electricity to other accessories requiring direct connection to a battery.

DESCRIPTION OF A PREFERRED EMBODIMENT

Figure 2:
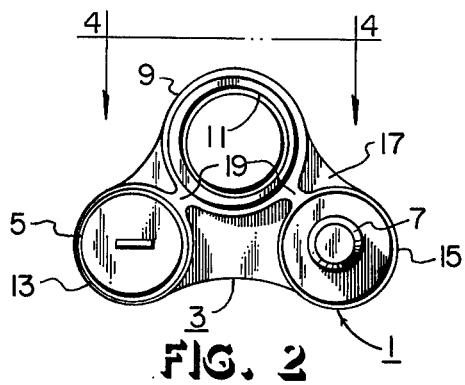
FIG. 2 is a top plan view of the left hand or negative auxiliary dual terminal.
Figure 3:
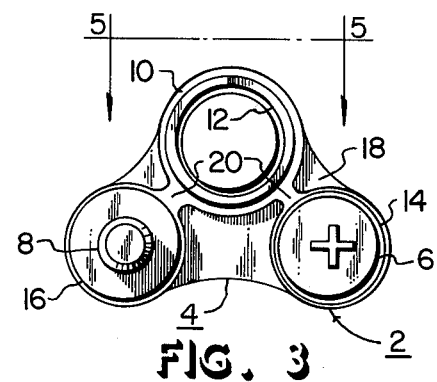
FIG. 3 is a top plan view of the right hand or positive auxiliary dual terminal.

In the drawings, the numerals 1, 2 designate respective negative and positive auxiliary dual post and stud type battery terminals embodying the principles of the invention and adapted to be mounted on the slightly tapered negative and positive terminal posts A, C of an electrical storage battery, a portion of which is designated by the letter B. As will be apparent, auxiliary terminals 1, 2 comprise generally flat bodies or plates 3, 4 of suitable weldable electrically conductive material, such as lead or lead alloy, and of generally triangular or generally T-shape contour in plan as shown in FIGS. 2, 3.

A slightly tapered cylindrical post 5, complementary to tapered negative battery terminal post A and of slightly less diameters (apex and base) than slightly tapered positive terminal post C of battery B, upstands from one or a first corner or extremity (left side of FIGS. 2, 4) of the generally flat, generally triangular or T-shaped body 3 of the negative auxiliary terminal 1. The similar body 4 of the positive auxiliary terminal 2 has a similar slightly tapered post 6 upstanding from a first corner or extremity thereof (right side of FIGS. 3, 5) opposed to the first corner or extremity of the other auxiliary terminal body 3 and complementary to the aforesaid positive battery terminal post C. An upright screwthreaded stud 7, 8, respectively, projects from a second corner or extremity of each terminal body in opposed spaced relation to its respective post 5, 6. Of course, the relative positions of the posts and studs of the auxiliary battery terminals are interchangeable, whereby the negative auxiliary terminal body 3 would resemble the positive auxiliary terminal body 4 and vice versa.

For mounting on negative, positive battery terminal post A, C, respectively, each terminal body 3, 4 has a respective upwardly or outwardly facing mounting collar 9, 10 projecting from and slightly above a third corner or extremity thereof (top of FIGS. 2, 3) in opposed spaced relation to the respective first and second corners or extremities of said body and its post 5, 6 and stud 7, 8. The interior or bore 11, 12 of each respective mounting collar 9, 10 is slightly tapered and is complementary to the respective diameters of battery terminal post A, C except that its smallest diameter is at the base or bottom of each auxiliary terminal body to permit release of said body from its mold or other forming means as well as being of sufficient size to accomodate said battery post.

Respective terminal post 5, 6 of each terminal body 3, 4 has an enlarged cylindrical base or bottom portion projecting above said body to provide an upset annular shoulder 13, 14 respectively. A similar boss or base portion 15, 16 upstands from the aforesaid second corner or extremity of each auxiliary terminal body concentrically of its respective stud 7, 8 to provide an upwardly facing shoulder of greater radial width than upset shoulder 13, 14 of respective body post 5, 6 due to the relatively small diameter of said stud relative to said post.

Figure 1:
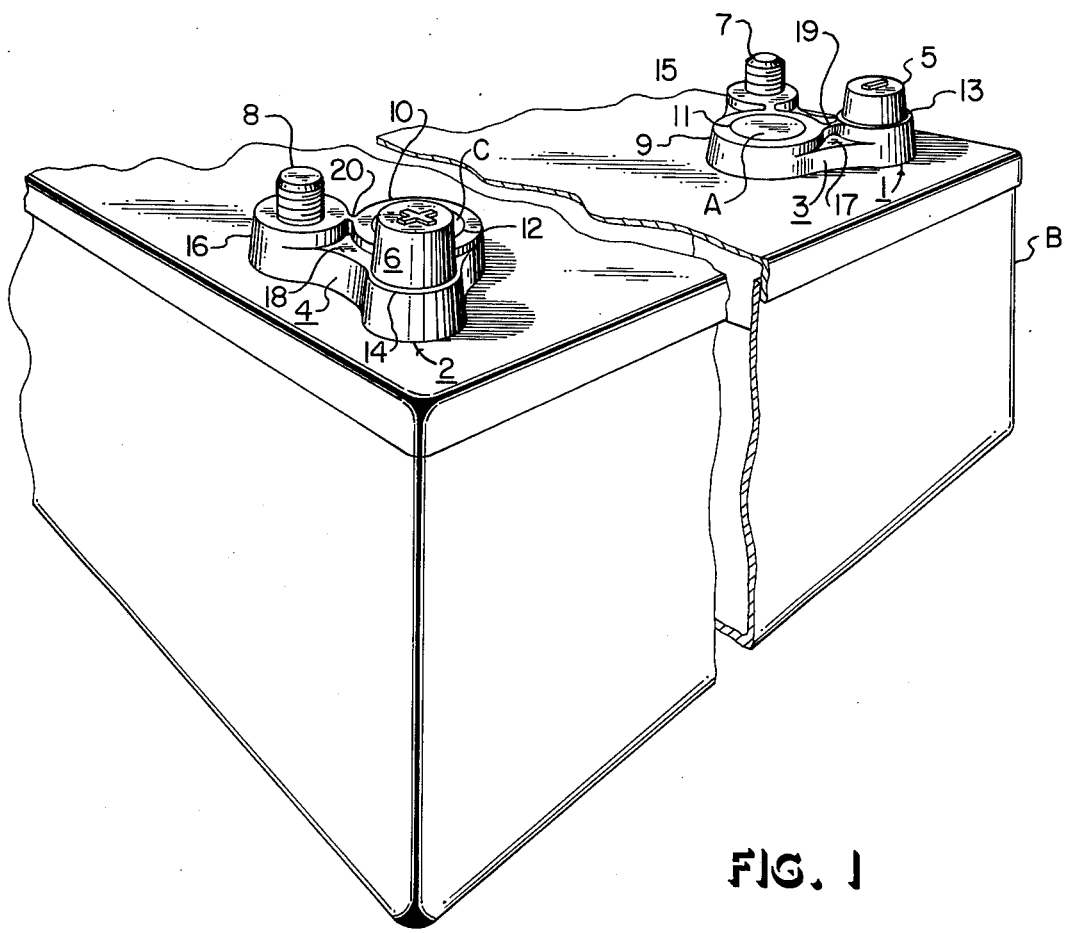
FIG. 1 is a broken perspective view of a portion of a conventional electrical storage battery illustrating the permanent connection of a pair of auxiliary post and stud type battery terminals, positive and negative or right and left hand and constructed in accordance with the invention, to the positive and negative terminal posts, respectively, of the battery.
Figure 4:
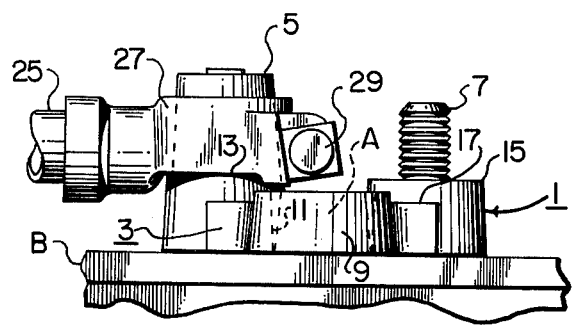
FIG. 4 is a side elevational view taken in the direction indicated by the numerals 4—4 of FIG. 2 and showing said negative auxiliary terminal mounted on said negative terminal post of said battery.
Figure 5:
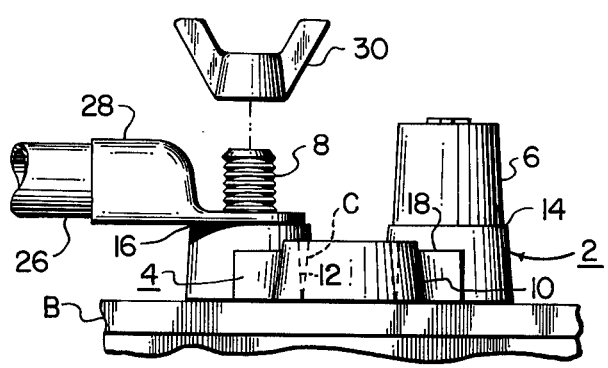
FIG. 5 is a view, similar to FIG. 4 and taken in the direction indicated by the numerals 5—5 of FIG. 3 to illustrate the mounting of said positive auxiliary terminal on said positive battery terminal post.

As best shown in FIGS. 1, 4, 5, collar 9, 10 of each terminal body 3, 4 may be of less height than respective base or lower portions 13, 14 and 15, 16 of post 5, 6 and stud 7, 8 of said body so as to terminate therebelow so as to facilitate access to said post and stud. Also, each auxiliary terminal body has a generally flat top or upper surface 17, 18, and respective upset narrow webs 19, 20 (FIGS. 1, 2, 3) thereon may extend between and connect the post and stud of each body to each mounting collar radially thereof. If desired, webs 19, 20 of each respective terminal body 3, 4 may be of the same elevation as collar 9, 10 so as to have flush top or upper surfaces. Due to the generally triangular or T-shape of each respective auxiliary terminal body, the axes of its post and stud are generally parallel to and spaced a greater distance from each other than from the axis of bore 11, 12 of the collar of said body; and said post and stud axes are disposed in a common plane in angular relation to said collar axis.

As disclosed by the prior art, it is most desirable to permanently secure the collar 9, 10 of each respective auxiliary dual terminal body to respective positive, negative posts A, C of battery B and such connection may be by any suitable fusing methods, such as welding, burning, soldering or puddling, whereby resistance to the flow of electrical current is minimized. This joining may be performed during the manufacture of the aforesaid battery posts and the associated plates or other elements of the battery or prior to assembly of said battery or after manufacture at a plant or in the field.

As mentioned hereinbefore, the slight relief taper of the bore 11, 12 of each respective mounting collar may be downwardly or inwardly from the flat top 17, 18 of each respective terminal body 3, 4 in reverse relation to the slight upward or outward relief taper of respective battery post A, C. The resulting gap between each collar and post is adapted to be filled by the conductive fusion material (not shown) and, if desired, the portion of each battery post projecting above its respective collar may be removed by cutting and/or melting.

An electrical cable or conductor 25, having a clamp collar type end terminal 27, is adapted to be detachably connected to its corresponding size post 5, 6 (FIGS. 4, 5) of auxiliary dual terminal body 3, 4 by engaging the clamp collar of its terminal over said post and tightening its bolt 29. The cable terminal 27 is adapted to rest upon the upset shoulder 13, 14 of the auxiliary post and thereby provide amplified surficial contact between said post and terminal of cable 25 as well as space said cable terminal above and away from the battery and its post. Although not illustrated, it is readily apparent that a clamp type terminal of a cable having an opposite electrical polarlity may be fastened to post 6 of terminal body 4 (FIG. 5) with the terminal resting on the shoulder 14 of said post.

Screwthreaded stud 7, 8 of auxiliary dual terminal body 3, 4 is adapted to be engaged by apertured flat lug type end terminal 28 of electrical cable or conductor 26 with the lug resting upon upset base shoulder 15, 16 of said stud so as to space the terminal of the cable above and away from the battery and its post. A suitable wing nut 30 is threaded on the stud to detachably secure terminal 28 of cable 26 thereto and maintain amplified surficial contact between said terminal and stud shoulder 16. Similarly, an apertured flat lug type end terminal of an opposite polarity cable (not shown) may be fastened to stud 7 of terminal body 3 with the terminal resting on the upset base shoulder 15 of said stud. If desired, stud 7, 8 may be composed of an upstanding bolt, of stainless steel or other corrosion-resistant material, having its head embedded in boss or base portion 15, 16.

It is noted that the triangular or T-shape of the flat body of each auxiliary dual battery terminal permits positioning thereof within the margins of a storage battery and its rack or other mounting to facilitate connection and disconnection of the end terminal (clamp collar or apertured flat lug type) of a cable or conductor to the upstanding post or screwthreaded stud of said terminal body. In addition, the spacing of the cable terminal above and away from the battery terminal post prevents the elevated battery caps and cell connectors from interfering with the readily detachable connection of said cable terminal. Access to the post and/or stud of the auxiliary terminal is facilitated by its mounting collar terminating below or inwardly of the shoulders of said post and stud whereby the clamp collar of the end terminal of a cable may overlie said collar. This also permits the body of the terminal to be of minimum size.

At times, it is necessary or desirable to connect an electrical motor or other accessory directly to a storage battery. The post 5, 6 and stud 7, 8 of the auxiliary dual battery terminal 1, 2 of this invention facilitates the attachment of the end terminals of electrical cables or conductors (not shown) to either or both of said negative and positive auxiliary terminal bodies 3, 4 in addition to the clamp collar terminal 27 and apertured flat lug type terminal 28 of respective cables 25, 26. When an end terminal is connected to the post 5, 6 of auxiliary terminal A, C, the stud 7, 8 of said terminal is free for engagement by an apertured flat lug type and terminal of an additional cable and vice versa.

The foregoing desciption of the invention is explanatory thereof and various changes in the size, shape and materials, as well as in the details of the illustrated construction may be made, within the scope of the appended claims, without departing from the spirit of the invention.

I claim:

1. An auxiliary dual post and stud battery terminal for installation on a storage battery having a terminal post projecting from a surface thereof comprising
   a generally flat body of weldable conductive material,
   a collar adjacent one margin of the body and having its opening generally complementary to the projecting terminal post of the battery,
   a terminal post upstanding from said body in spaced relation to the collar and generally complementary to said battery terminal post, and
   a screwthreaded stud upstanding from said body in spaced relation to its collar and post.

2. An auxiliary dual battery terminal as defined in claim 1 wherein
   the collar of the body terminates below the upstanding terminal post and stud of said body and said post and stud are spaced a greater distance from each other than from said collar so as to increase the accessibility of said post and 3. An auxiliary dual battery terminal as defined in claim 1 wherein
   the axes of the upstanding terminal post and stud of the body are disposed in a common plane in angular relation to the axis of the collar of said body.

4. An auxiliary dual battery terminals defined in claim 1 wherein
   the body is generally triangular and its collar, post and stud are at its corners.

5. An auxiliary dual battery terminal as defined in claim 1 wherein
   the post and stud of the body have enlarged base portions to provide upwardly facing shoulders for supporting the terminals of conductors in spaced relation to the terminal post of the battery and to amplify the surficial contact between said conductor terminals and said post and stud of said body.

6. An auxiliary dual post and stud battery terminal for installation on a storage battery having a terminal post projecting from a surface thereof comprising
   a generally flat generally triangular plate of weldable conductive material,
   a collar adjacent one corner of the plate for connecting said plate to the projecting terminal post of the battery,
   an upright terminal post adjacent a second corner of said plate, and
   an upright threaded stud adjacent a third corner of said plate.

7. An auxiliary dual battery terminal as defined in claim 6 wherein
   the terminal post and threaded stud of the plate have upwardly facing surfaces intermediate their inner and outer ends for supporting the end terminals of conductors in outwardly spaced relation to the terminal post of the battery, the surfaces being of greater area than said post and stud to provide amplified suficial contact with said conductor terminals.

8. In combination, a terminal post of an electrical storage battery, an auxiliary dual post and stud battery terminal connected to the terminal post of the battery including
   a generally flat body of fusible electrically conductive material,
   a collar adjacent a first margin of the body and engaged over said battery terminal post for mounting said body thereon, an upright terminal post adjacent a second margin of said body in spaced relation to the collar, the terminal post of said body being complementary to said battery terminal post, and an upright screwthreaded stud adjacent a third margin of said body in spaced relation to said collar and terminal post of said body.

9. The combination defined in claim 8 wherein the terminal post and screwthreaded stud of the body have enlarged base portions to provide upwardly facing shoulders spaced above said body supporting the terminals of electrical conductors away from the battery terminal post, the shoulders being of enlarged area to provide amplified contact between said conductor terminals and said body post and stud.

10. The combination defined in claim 8 wherein the collar of the body terminates below the outer ends of the post and stud of said body whereby said post and stud may be in relatively close proximity to said collar without sacrificing the accessiblity of said post and stud.

* * * * *